May 12, 1942.  R. W. SMITH ET AL  2,282,431
ORIENTING DEVICE AND METHOD
Filed June 12, 1939  2 Sheets-Sheet 1

Inventors
RAY W. SMITH
MORRIS McDANNALD
By E. V. Hardway,
Attorney

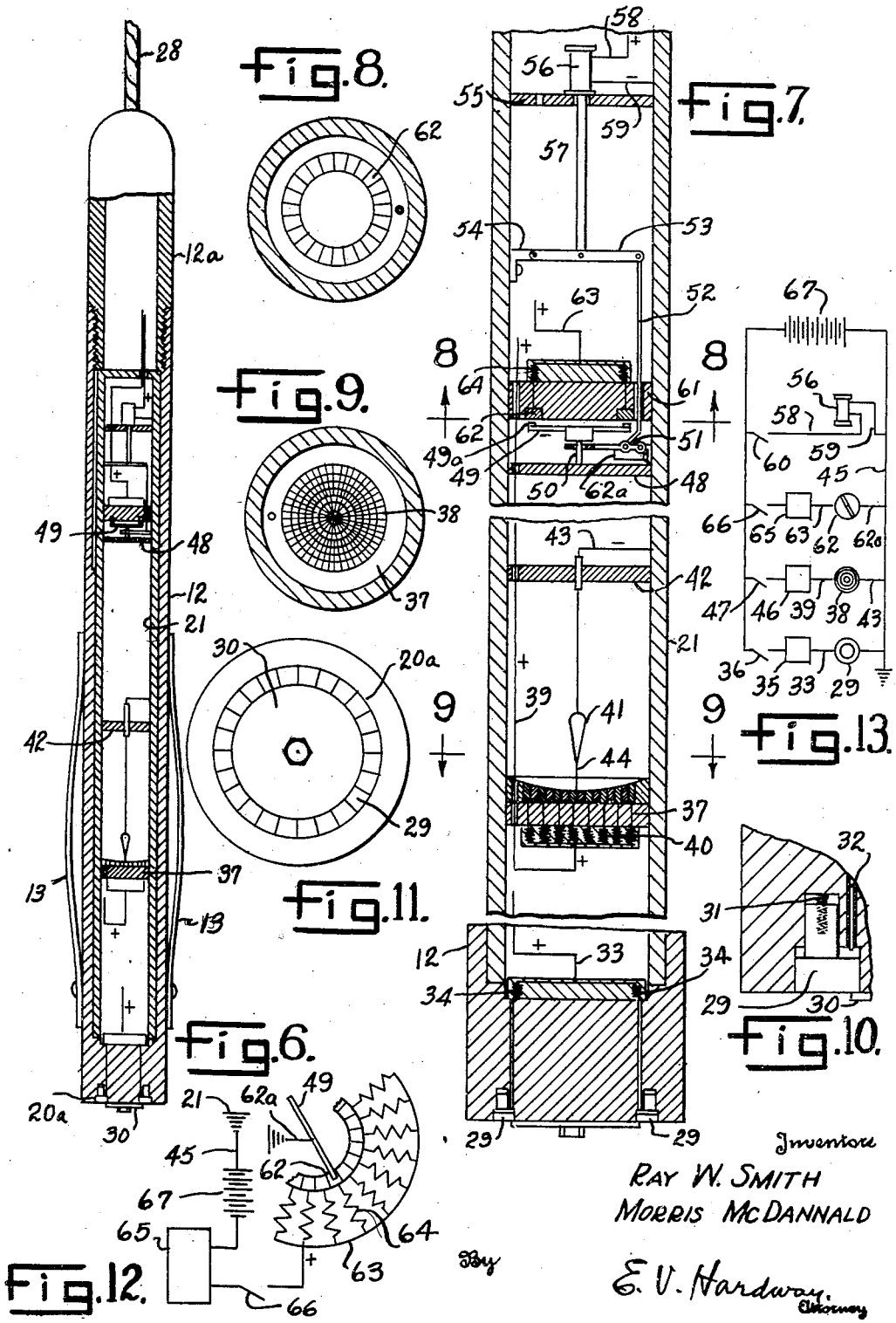

Patented May 12, 1942

2,282,431

UNITED STATES PATENT OFFICE 2,282,431

ORIENTING DEVICE AND METHOD

Ray W. Smith and Morris McDannald, Houston, Tex.

Application June 12, 1939, Serial No. 278,682

14 Claims. (Cl. 255—1.6)

This invention relates to an orienting device and method.

An object of the invention is to provide apparatus for orienting objects in bore holes and is useful also for surveying bore holes.

Another object of the invention is to provide apparatus of novel construction, more specifically hereinafter described which may be lowered into and withdrawn from a well and whereby a visible record will be made of the azimuthal position of an object in the bore hole and of the direction, with respect to the vertical, of the well bore at the selected elevation.

More specifically the invention embodies an outer barrel, or housing adapted to be lowered into, and located in, a non-magnetic section of a drill pipe in which a conventional surveying apparatus embodying a compass is located with co-acting means on the barrel, and stem, said surveying apparatus and co-acting means being adapted to make related records of data from which the desired information as to the situation in the well bore may be derived.

Advantages of the form of the apparatus and method above referred to over these heretofore used lies in the fact that there is no material blocking or restricting of the inside of the drill stem to interfere with circulation; there are no movable parts to cause mechanical failures and accuracy of the survey is assured because no impression is made on the instrument until it has positively seated at home position; and because the operation of the device is not dependent upon the functioning of guiding parts which are liable to become clogged by clogging material in the well.

Another embodiment of the invention includes means for indicating to the operator at the ground surface the azimuthal position of an object in the bore hole as well as the direction, with respect to the vertical of the well bore at the selected elevation and the degree of deviation from the vertical.

With the above and other objects in view the invention has particular relation to certain novel features of construction, operation and arrangement of parts, an example of which is given in this specification and illustrated in the accompanying drawings, wherein:

Figure 6 shows a vertical, sectional view of another embodiment showing the outer barrel within which the operative mechanism of the surveying instrument is located, said mechanism being shown diagrammatically.

Figure 7 shows an enlarged, fragmentary, vertical, sectional view thereof.

Figure 8 shows a cross-sectional view taken on the line 8—8 of Figure 7.

Figure 9 shows a cross-sectional view taken on the line 9—9 of Figure 7.

Figure 10 shows an enlarged, fragmentary, vertical, sectional view.

Figure 11 shows a bottom end view.

Figure 12 shows a wiring diagram emboding a meter.

Figure 13 shows a diagram of the circuits.

Figure 1:
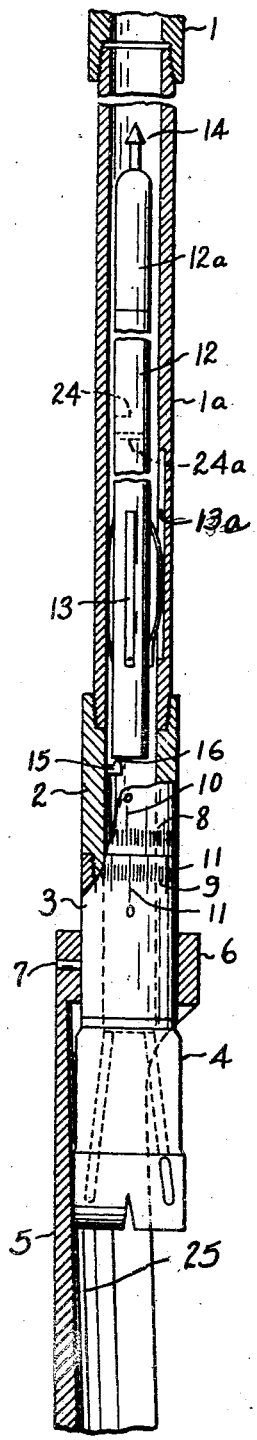
Figure 1 shows a vertical, sectional view of a deflecting tool as the object to be oriented with a drill stem assembled therewith preparatory to setting the deflecting tool in the well showing also the outer barrel of the surveying instrument located in a non-magnetic section of the stem, only a fragmentary view of the deflecting tool being shown.

Referring now more particularly to the drawings wherein like numerals of reference designate the same parts in each of the figures, the numeral 1 designates the conventional tubular drill stem, a section 1a of which is composed of suitable non-magnetic metal and of a length sufficient to locate the compass, hereinafter referred to, out of the magnetic field of adjacent metal parts. It is obvious that the non-magnetic section 1a may be located anywhere in the stem.

As illustrated the lower end of the non-magnetic section 1a is screwed into the upper end of the tubular pin member 2 which, in turn, has a threaded connection with the tubular box member 3 beneath to the lower end of which the bit 4 is attached. The numeral 5 may designate a conventional deflecting tool as the object to be oriented. This tool may be a whipstock or any other form of deflecting tool or other appliance. As shown it is provided at its upper end with a collar 6 to receive the tubular box member 3 which box member is attached to the collar so that it may be readily detached, as, for example, by means of a frangible pin 7. The adjacent ends of the pin member 2 and box member 3 are externally graduated, that is, they are provided with the degree scales 8 and 9 having the zero marks 10, 11.

There is an outer barrel 12 whose upper end may be closed by a removable cap 12a and whose lower end is also closed. This outer barrel has the outwardly bowed, flexible guides 13 thereon for maintaining the barrel in axial relation with the stem.

The barrel may be provided with a suitable conical shaped head 14, upstanding therefrom or other suitable means adapted to be engaged by a grappling tool for removal of the barrel and the surveying apparatus therein from the stem. Within the stem beneath, or near the lower end of the non-magnetic section 1a there is an inwardly extended marker 15, preferably constructed with an upwardly directed tang 16 which may have a unique shape so that the identification of its impression is positive.

The lower end of the barrel 12 has an annular graduated scale 17 having a zero mark 18 and said lower end is also provided with an annular impression receiving element 19 which may be located in an annular groove 20 and formed of soft metal or other readily deformable material to receive an impression to be made by the tang 16.

The operative mechanism of the surveying instrument is enclosed within a tubular housing 21 which has an external key 22 thereon. This key fits into an inside groove 23 in the housing or barrel 12. The housing 21 and the operative mechanism of the surveying instrument is thus fixed with respect to the outer barrel 12. The instrument is provided with a pointer 24 which is fixed on the tubular housing 21 relative to the compass 24a and preferably, although not necessarily aligned with the groove 23. The parts of the surveying instrument mechanism, where necessary, are made of non-magnetic metal.

With the apparatus thus assembled as the tool 5 is lowered into the well the relation between the deflecting face 25 of the deflecting tool and the zero marks 10, 11 is noted and the relation of the marker 16 to the zero marks 10, 11 is also noted.

The apparatus is then run into the bore in the ordinary way. Upon reaching the bottom the pipe is moved up and down the required number of times to remove the torque and the outer barrel with the surveying instrument therein is then dropped, lowered or pumped down into the drill stem until the lower end of the barrel 12 lands on the tang 16 which is so positioned as to make a mark, or impression, 26 on the impression receiving element 19. During descent the barrel is free to rotate. The downward movement of the barrel will thus be stopped with the barrel located in the non-magnetic section 1a as shown in Figure 1. As an alternative the instrument may be placed in the non-magnetic section, and landed on the marker 16, at the surface as the stem is made up and lowered with the stem in which case one of the springs 13 is located in the inside keyway 13a to prevent radial movement of the instrument while lowering. After the instrument is lowered to the desired depth in the bore the picture is taken and the barrel and the instrument therein removed by the usual grapple operated by a wire line or by other means and the picture as 27 is developed showing the relation of the pointer 24 to the compass and also showing the degree and direction of inclination of the bore. The relation of the pointer 24 with respect to the zero mark 18 will be known and upon withdrawal of the instrument from the well the relation of the mark 26 to said zero mark 18 and to the pointer 24 may be noted and from the data thus ascertained the direction in which the deflecting tool, or other object, is facing, that is, its azimuthal relation with the bore, can be readily ascertained. If it is not already facing the desired direction the drill stem may be turned until the tool or object faces the direction desired. In case a deflecting tool is oriented in this way the drill stem may be lowered shearing the pin 7 and the drill stem may then be rotated causing the bore to be deflected in the desired direction.

The above described survey may be repeated, after orienting, for confirmation of the accuracy of the orientation, and may also later be repeated during drilling operations.

Figure 2:
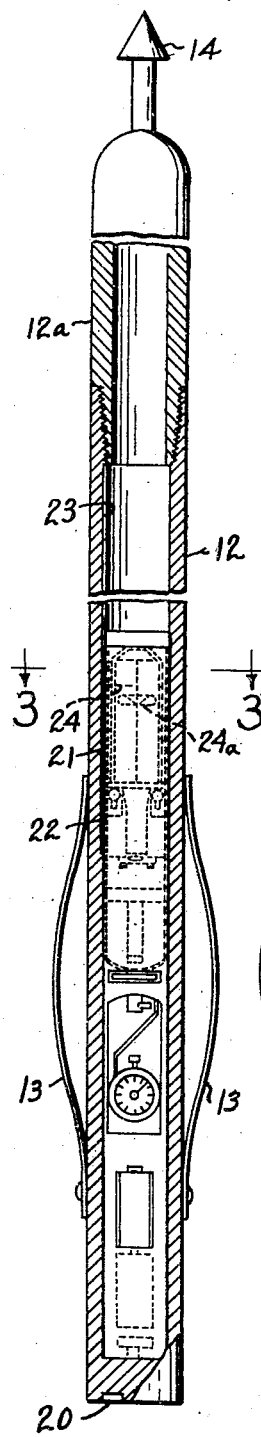
Figure 2 shows a vertical, sectional view of the outer barrel within which is the operative mechanism of the surveying instrument, said mechanism being shown diagrammatically.
Figure 3:
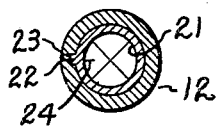
Figure 3 shows a cross-sectional view taken on the line 3—3 of Figure 2.
Figure 4:
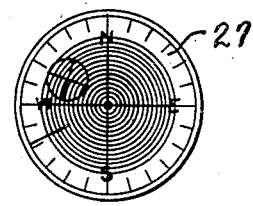
Figure 4 shows a plan view of the direction chart.
Figure 5:
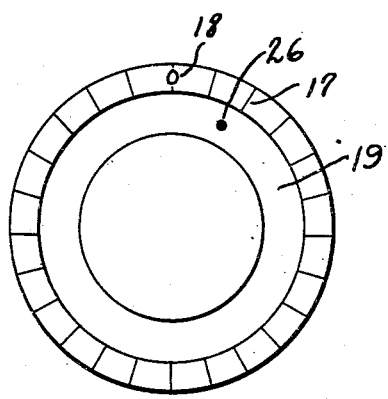
Figure 5 shows an enlarged, lower end view of the outer barrel.

The surveying instrument, it is to be noted, may be of any selected form, such, if desired, as hereinbefore referred to and shown in Figure 2.

Referring now to the embodiment illustrated in Figures 6 to 12, inclusive, the outer barrel 12 is employed whose upper end is closed by the removable cap 12a and whose lower end is also closed. In this embodiment the barrel is let down into the bore by means of a suitable cable 28. In this embodiment of the invention there are seated in the lower end groove 20a of the barrel the depressible electrical switches 29 which are maintained in the groove by means of a central disc 30 which is bolted to the lower end of the barrel and whose outer margin overlaps said switches 29 as shown in Figure 10. These switches are held in their lower open position by means of the pressure springs 31. When the barrel is lowered into the well, in the manner indicated in Figure 1 one of the switches will land on and be depressed by the tang 16 moving the corresponding switch into contact with the corresponding contact member or rod 32. The contact members 32 are electrically connected to a common lead 33 through independent resistances as 34, the impedance of each resistance being different from that of each of the other resistances. Upon contact of a switch 29 with its corresponding rod 32 an electrical circuit will be completed, one side of the circuit being through the metal of the barrel 12 and the other through the lead 33. This lead wire 33 leads on upwardly to the ground surface through the cable 28 and the other side of the circuit leads on up from the barrel 12 through a wire 45 incorporated into the cable 28, and these circuit wires are connected into a suitable meter as 35 at the ground surface. The circuit, however, may be opened and closed by means of a conventional switch such as 36. The particular switch 29 which is depressed will be dependent on the azimuthal position of the barrel in the bore hole at the time of contact. The location, or arrangement, of the switches will be known to the operator and each switch will give, at the surface, a different signal depending on the impedance offered by its corresponding resistance.

At a suitable location in the housing 21 there is mounted a suitable support 37 on which are the concentric segmental contact rings 38. Each segment of each ring is connected to a common lead wire 39 the connections having individual resistances 40 therein, the impedance of each resistance being different from that of the other resistances. A pendulum 41 is swung from a support 42 fixed at a convenient place in the housing 21 above the support 37 and is electrically connected with the housing through the electrical conductor 43. The lower end of the pendulum is formed with a brush 44 adapted to contact the segments and form an electrical connection therewith. The upper surface of the assembly of the rings 38 is that of a spherical segment. Accordingly, as the vertical position of the housing varies the brush 44 will sweep across the upper surface of the ring assembly and when a reading is taken the brush will be in contact with the segment vertically beneath it. A circuit will accordingly be completed through the lead 39, which extends to the ground surface through the cable 28 and through the common lead 45 which continues from the metal barrel 12 up through the cable 28. A meter 46 is connected into this circuit and the circuit may be opened and closed by a switch 47. Inasmuch as the impedance of the resistances 40 are different and inasmuch as the arrangement of the segments is known to the operator the data revealed by the meter 46, to the operator shows, the particular segment with which the brush 44 is in contact and therefore the degree and direction of inclination in the bore, if any, of the barrel 12.

In the housing 21 above the support 42 there is a support 48 forming a mounting for a magnetic compass needle 49 mounted to pivot on the upstanding pin 50 on the support 48. An arm 51 is pivoted at its outer end to the housing 21 and its inner end has a bearing on the pin 50. The lower end of the link 52 is pivotally connected to said arm at an intermediate point and the upper end of the link 52 is pivotally connected to the free end of the lever 53, the other end of said lever being pivotally connected to a bracket 54 which is secured to the housing. Mounted on a suitable support 55 secured in the housing above the compass there is an electro-magnet 56 having a core 57 which is extended downwardly and pivotally connected to the lever 53. The magnet coil is connected to the lead wire 58 and to the common lead 45 through the conductor 59. An electrical circuit is thus completed which may be opened and closed through the switch 60.

In the housing above the compass needle and beneath the support 55 there is a support 61 which has, on its under side, a circular row of contacts 62 connected with a lead 63 through resistances 64. The impedance of each resistance 64 is different from that of the other resistances 64. The lead 63 extends up through the cable 28 to the ground surface and together with the common lead 45 forms a circuit in which the meter 65 is connected, said circuit being provided with the switch 66 through which it may be opened and closed.

When the instrument is lowered into the well bore all the switches 36, 47, 60 and 66 are opened and the compass needle 49 may therefore act in its usual way. When a reading is to be taken the switch 60 is closed completing a circuit through the electro-magnet 56 elevating the lever 53 and the arm 51 so that the latter will elevate the needle 49 into conducting relation with only one of the contacts 62, above, as one of the projections 49a on the needle 49 is formed of insulating material and the other projection is formed of an electrical conducting material. The switch 66 may then be closed and a circuit will thus be completed through the lead 63, resistance 64, contact 62, projection 49a, needle 49, arm 51, wire 62a which connects the arm 51 to the housing 21, thence through the common lead 45, and a compass reading may be taken from the meter 65. The individual circuit of the compass is shown in Figure 12, which circuit is also similar to those of the other two reading circuits. The switches 36 and 47 may then be successively closed and an azimuthal reading taken from the meter 35 and an inclination reading taken from the meter 46. From this data the azimuthal position of the object in the well may be readily ascertained as well as the direction and degree of inclination determined.

Figure 13 shows the composite circuit of the connections between the reading instruments and the meters 35, 46, 65 and switches 36, 47, 60, 66 which are located on the ground level. The individual circuits may be connected in parallel with a suitable source of electromotive energy as a battery 67. It is of course contemplated that the wires and resistances will be suitably insulated from each other and the housing 21 so that the electrical control and reading means will function properly.

The drawings and description are illustrative merely and not restrictive while the broad principle of the invention will be defined by the appended claims.

What we claim is:

1. In apparatus of the character described a guide adapted to be located in a well bore and having a section of non-magnetic material, a marker on the guide, a surveying instrument embodying a compass shaped to be lowered into the well along the guide to its home position with its compass in the non-magnetic field of said section, an impression receiving element associated with the instrument and positioned to land on the marker when the instrument reaches said home position and to co-act with the marker to receive indicating datum whereby the azimuthal position of the instrument relative to the guide, when the instrument is in home position, may be ascertained.

2. The method of ascertaining the azimuthal position of a drill stem in a well whether vertical or inclined which consists in lowering the stem, into a well, lowering a surveying instrument to home position in the stem, allowing the instrument to move freely about the axis of the stem during its downward course, allowing said instrument to co-act with a marking means to make an indication thereon, making a record by said instrument, when in said home position, withdrawing the instrument, comparing the record with said indication and rotating the drill stem to bring the same to a predetermined azimuthal position.

3. The method of determining the azimuthal position of a drill stem or other object in an inclined well bore and of orienting a tool carried by the stem or object, which method consists in lowering said stem, or object, into the bore, allowing a well surveying instrument to move freely through the stem or object to home position relative thereto, making a perceptible record on said surveying instrument when in said home position, making a record, by said instrument, when in home position, withdrawing said instrument from the well bore and relating said records to ascertain data from which the azimuthal position of the stem or object can be ascertained and then rotating the stem to bring a tool carried thereby to a predetermined azimuthal position.

4. The method of ascertaining the azimuthal position of a drill stem in a vertical well and of orienting a tool carried by the stem which consists in lowering the stem into the well, causing the flight of a surveying instrument to home position in the stem, allowing free movement of the instrument about the axis of the stem during said flight, allowing said instrument to co-act with a marking means in the stem to make an indication thereon, making a record by said instrument when in said home position, withdrawing the instrument, comparing the record with said indication and rotating the stem to bring the tool to a predetermined azimuthal position.

5. The method of ascertaining the azimuthal position of a drill stem in a well in which the direction of inclination, if any, is not known, and of orienting a tool on the stem, which method consists in lowering the stem into the well, causing the flight of a surveying instrument to home position in the stem while permitting free movement of the instrument about the axis of the stem during said flight, allowing said instrument to co-act with a marking means to form an impression on the instrument, making a record by said instrument when the instrument is in said home position, withdrawing the instrument, comparing the record with said impression and rotating the stem to bring the tool into a predetermined azimuthal position.

6. In apparatus of the character described a tubular guide adapted to be located in a well bore and having a section of non-magnetic material, a marker on the inner wall of the guide, a surveying instrument embodying a compass and shaped to be lowered into the well in the guide to home position with its compass in the non-magnetic field of said section, an impression receiving element formed of relatively soft material and located on the lower end of the instrument and positioned to land on the marker when the instrument reaches said home position and to co-act with the marker to receive an indicating mark whereby the azimuthal position of the instrument relative to the guide, when the instrument is in home position, may be ascertained.

7. The method of determining the azimuthal position of a drill stem or other object in a well bore and orienting a tool on the stem which method consists in lowering said stem, or object, into the bore with the tool attached, causing the flight of a surveying instrument, embodying a compass, to home position relative to the stem, or object, with the compass of the instrument in a non-magnetic field of the stem, or object, making a perceptible record on said surveying instrument when the latter is in said home position, making a record, by said instrument, when the instrument is in home position, withdrawing said instrument from the well bore and reading said records, ascertaining data therefrom from which the azimuthal position of the stem, or object, in the well bore, can be ascertained, then turning the stem, or object, to bring the tool to a predetermined azimuthal position.

8. The method of orienting a tool within a bore hole including lowering the tool into the bore hole on a hollow drill stem, lowering within the drill stem an instrument containing means for indicating azimuth, a magnetic compass and means for indicating direction and degree of inclination from the vertical, and means for recording the indications of the azimuth-indicating means and the compass, and the inclination indicating means, said lowering of the instrument being to a point where the compass is outside the magnetic influence of any objects, other than the earth, allowing the instrument to move freely about the axis of the stem during its downward course and allowing said instrument to co-act with a marking means to make an indication thereon; thereafter causing said recording means to operate, withdrawing said instrument; comparing the record with said indication; and rotating the drill stem to bring the tool into a predetermined azimuthal position.

9. The method of orienting a tool within a bore hole including lowering the tool into the bore hole on a hollow drill stem, the lower portion of which drill stem has a non-magnetic section; lowering within the drill stem an instrument containing a magnetic compass and means for recording the indications of said compass, said lowering of the instrument being to a point where the compass is located in the non-magnetic section of the drill stem and is spaced from other metal objects so that it responds solely to the earth's magnetic field, causing the instrument to co-act with a marking means in the position in which the instrument unrestrictedly of itself makes contact with the marking means, causing an indication to be made on the instrument, thereafter causing said recording means to operate; withdrawing said instrument; comparing the record of the instrument with said indication and rotating the drill stem to bring the tool into a predetermined or desired azimuthal position.

10. The method of orienting a tool within a bore hole including lowering the tool into the bore hole on a hollow drill stem, lowering within the drill stem an instrument containing means for indicating azimuth and a compass, said lowering of the instrument being to a point where the compass is affected solely by the earth's magnetic influence and where the instrument makes contact with a marking means when in an unguided and unrestricted axial position, thereafter determining the relative indications of the azimuth indicating means and of the marking means, withdrawing said instrument, and rotating the drill stem to bring the tool into a predetermined azimuthal position.

11. The method of orienting a tool within a bore hole including lowering the tool into the bore hole on a hollow drill stem, the lower portion of which drill stem carries a non-magnetic section, lowering within the drill stem an instrument containing means for indicating azimuth, a magnetic compass, and means for recording the indications of the azimuth indicating means and the compass, said lowering of the instrument being to a point where the compass is within the non-magnetic section, and to a point where the instrument co-acts with a marking means, thereafter causing said recording means to operate, withdrawing said instrument, comparing the recording of the instrument with the indication of the marking means, and rotating the drill stem to bring the tool into a predetermined azimuthal position.

12. The method of orienting a drill stem within a bore hole including lowering the drill stem into the bore hole the lower portion of the drill stem carrying a non-magnetic section, lowering within the drill stem an instrument containing means for indicating azimuth and a magnetic compass, said lowering of the instrument being to a point where the compass is within the non-magnetic section and receives an indication from a marking means, thereafter determining the relative indications of the azimuth indicating means and of the marking means, withdrawing said instrument and rotating the drill stem to bring the tool into a predetermined azimuthal position.

13. In a method of determining the azimuthal orientation of a device that is moved within and longitudinally of a bore hole, the steps comprising initially placing a surveying instrument in the bore hole at a point where it makes contact with a marking device in an unrestricted axial position, then making a record with the surveying instrument, thereafter withdrawing the surveying instrument and correlating the record of the surveying instrument with the indication of the marking means, the marking means being in known fixed relation to the said device.

14. In a method of determining the orientation of a device that is progressively moved within and lonigtudinally of an earth bore, at any point of such movement while fixed to an elongated member, the steps comprising initially determining the rotational relation of the device about its axis with respect to a marking means, moving a surveying instrument within and longitudinally of the bore hole and measuring at said point with the surveying instrument the rotational relationship of the marking means to the magnetic north.

RAY W. SMITH.
MORRIS McDANNALD.